United States Patent Office 2,824,878
Patented Feb. 25, 1958

2,824,878

SYNTHESIS OF PHENYLAMINO PROPANEDIOL ALKYLETHERS AND INTERMEDIATES OBTAINED THEREBY

Carlo G. Alberti, Milan, Luigi Bernardi and Giovanni Larini, Settimo Torinese, and Alberto Vercellone, Milan, Italy, assignors to Societa Farmaceutici Italia, a corporation of Italy No Drawing. Application October 18, 1955
Serial No. 541,532

Claims priority, application Italy October 22, 1954

13 Claims. (Cl. 260—307)

The present invention relates to a new method of preparing 1-aryl-2-amino-3-alkoxypropane-1-ols, having the general formula

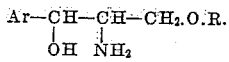

wherein Ar represents an aryl group and R represents a lower alkyl group. Moreover, the invention relates to new intermediates obtained in the course of preparing these compounds.

Arylamino alkoxy propanols are valuable starting materials in preparing pharmaceutical compounds, such as members of the group of aminoalcohols which includes a great number of natural and synthetic compositions exhibiting sympathomimetic, spasmolytic, anesthetic and other desirable pharmacological effects. Recently, even an antibiotic compound, chloroamphenicol (D-threo-1-p-nitrophenyl-2-dichloroacetamino-1,3-propanediol) has been added to this group. Phenylamino propanediols, such as 1-phenyl-2-amino-3-methoxypropane-1-ol, may be readily transformed into chloramphenicol.

The herein disclosed synthesis of 1-aryl-2-amino-3-alkoxypropane-1-ols comprises condensing an arylaldehyde (1), particularly an excess of benzaldehyde, with an α-halo-β-alkoxy-alkyl propionate (2) in the presence of zinc in an anhydrous solvent such as ethyl ether or benzene, or a mixture of the two, at a temperature between 0° and 100° C.

α-Halo-β-alkoxy-alkyl propionates would be expected to lose their alkoxy group under the influence of the action of the zinc rather than enter into a condensation with the aldehyde. We made the surprising discovery, however, that, under the aforestated conditions, this reaction is contained to such an extent that it does not interfere to any substantial degree with the afore-mentioned condensation.

Thus, α-alkoxymethyl-β-hydroxy-β-aryl alkyl propionate (3) is obtained, the hydrazide (4) of which, resulting from the reaction with hydrazine hydrate in boiling alcohol, is transformed into a 5-aryl-4-alkoxy-methyl-2-oxazolidone (5) upon treatment with nitrous acid in cold acetic solution (—5° to +5° C.).

By means of saponification, these oxazolidones give the desired 1-aryl-2-amino-3-alkoxypropane-1-ols (6), that may be more readily isolated in form of their salts. Saponification is accomplished by heating with either acids or bases. Particularly efficient for this purpose are concentrated hydrochloric acid or a boiling, saturated baryta solution. The saponification takes from 2 to 10 hours.

The above-described synthesis may be represented by the following reactions:

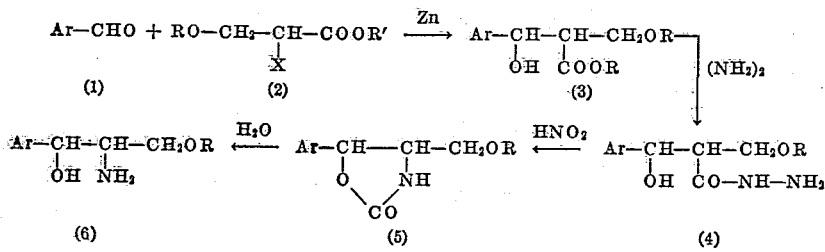

wherein Ar represents an aryl and R,R' represent lower alkyls.

The compositions according to this invention include two centers of asymmetry and, therefore, may occur in the form of diastereoisomers, the so-called threo-and erythro-diastereoisomers, while each of them in turn may be present in the dextro-rotatory, laevo-rotatory or racemic form.

Except where expressly indicated, this specification relates to any of these isomers and to mixtures thereof.

The following example is furnished to illustrate, but not to limit the present invention in any manner. The reactants set forth therein may be obviously substituted by other reactants of similar properties without departing from the scope of the appended claims.

*Example*

26 gr. of granular zinc to which a small iodine crystal is added, are heated in a suitable flask until incipient iodine sublimation. A solution of 60 gr. benzaldehyde and 69 gr. β-methoxy-α-bromo-methyl propionate in a mixture of 130 cc. benzene and 40 cc. ether is then slowly added. All these materials must be perfectly anhydrous. Upon completion of the addition, a brisk reaction takes place and Zn is slowly dissolved. After heating to 70° C. for 45 minutes, the reaction mixture is cooled. Upon adding 100 gr. ice and 110 cc. water, $H_2SO_4$ is carefully added until the solution is acid against Congo paper. The benzene layer is separated and, after dehydration, is evaporated under reduced pressure. The residue, a thick gummy substance, is distilled in high vacuum (B. P. 144°–146° C. at 3 mm. Hg residual pressure) and erythro-α-methoxymethyl-β-phenyl-β-methyl hydracrylate is obtained in the form of a viscous oil.

To the erythro-α-methoxymethyl-β-phenyl-β-hydroxymethylpropionate (15 gr.), diluted with absolute alcohol (10 cc.) are added 6 gr. of 85% hydrazine hydrate and the mixture is heated for 1 hour on a boiling water-bath. The warm solution is filtered with 0.5 gr. of decolorizing charcoal and is left standing to crystallize. The corresponding hydrazide obtained in this manner has a M. P. of 119°–120° C.

8 gr. CH₃COOH are added to a suspension of 11 gr. of erythro-α-methoxymethyl-β-phenyl-hydracrylic acid hydrazide in 80 cc. H₂O and 25 gr. ice and then slowly, while vigorously stirring, a solution of 7 gr. NaNO₂ in 20 cc. H₂O. A gummy substance is obtained which, upon extraction with benzene after evaporation of the solvent, leaves a residue that is oily at first but, after addition of a small amount of ether, changes to crystalline cis-4-methoxymethyl-5-phenyl-2-oxazolidone which, upon recrystallization from a benzene-ether mixture, is obtained in form of small white flakes having a M. P. of 134°–135° C.

6 gr. of this material are dissolved in 100 cc. alcohol, added to a solution of 18 gr. barium hydroxyde in 500 cc. of water. After refluxing for 6 hours, the mixture is cooled and acidified with hydrochloric acid. The alcohol and part of the water are then distilled off in vacuum, the mixture is made alkaline and extracted 6 times with ethylacetate (50 cc. each time), dried with sodium sulfate and evaporated in vacuum. A yellow oil is left which does not crystallize.

Upon taking this oil up with ether and adding an ether solution of HCl, chlorohydrate of erythro-1-phenyl-2-amino-3-methoxypropane-1-ol separates as a solid product which after recrystallization from alcohol-ether has a M. P. of 164°–166° C.

We claim:

1. The process of preparing 1-aryl-2-amino-3-alkoxy-propane-1-ols that have the general formula

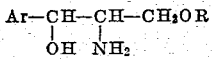

wherein Ar represents an aryl and R represents a lower alkyl, said process comprising reacting an aryl aldehyde with an α-halo-β-alkoxy alkyl propionate in an anhydrous solvent solution and in the presence of zinc at a temperature between 0° and 100° C., cooling, taking up with water, acidifying against Congo paper, separating and dehydrating the solvent layer, evaporating the solvent, distilling the residue in high vacuum, dissolving distilled α-alkoxy-methyl-β-hydroxy-β-aryl alkyl propionate in anhydrous alcohol, adding hydrazine hydrate, heating on a boiling water-bath, letting the solution stand, separating the crystalline precipitate of hydrazide of α-alkoxy-methyl-β-hydroxy-β-aryl-alkyl propionate, suspending in ice water, treating in the cold with nitrous acid, extracting with a solvent and evaporating in vacuo to separate 5-aryl-4-alkoxy-methyl-2-oxazolidone, dissolving in alcohol, refluxing for 2 to 10 hours with a saponifying agent, and separating the resulting 1-aryl-2-amino-3-alkoxypropane-1-ol.

2. The process of preparing α-alkoxymethyl-β-hydroxy-β-aryl-alkyl propionates of the general formula

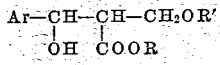

wherein Ar represents an aryl and R, R' represent lower alkyls, said process comprising reacting an arylaldehyde

with an α-halo-β-alkoxy-alkyl propionate

wherein R, R' represent lower alkyls and X represents a halogen, in an anhydrous solvent solution and in the presence of zinc at a temperature between 0° and 100° C., cooling, taking up with water, acidifying against Congo paper, separating and dehydrating the solvent layer, evaporating the solvent and distilling the residue in high vacuum to separate α-alkoxy-methyl-β-hydroxy-β-aryl-alkyl propionate.

3. The process according to claim 2, wherein said arylaldehyde is benzaldehyde, said α-halo-β-alkoxy-alkyl propionate is α-bromo-β-methoxy-methyl propionate and said solvent is a mixture of anhydrous ethyl ether and benzene.

4. The process of preparing hydrazides of α-alkoxy-methyl-β-hydroxy-β-aryl-alkyl propionates of the general formula

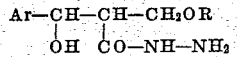

wherein Ar represents an aryl and R represents a lower alkyl, said process comprising reacting an arylaldehyde with an α-halo-β-alkoxy-alkyl propionate in an anhydrous solvent solution and in the presence of zinc at a temperature between 0° and 100° C., cooling, taking up with water, acidifying against Congo paper, separating and dehydrating the solvent layer, evaporating the solvent, distilling the residue in high vacuum, dissolving distilled α-alkoxy-methyl-β-hydroxy-β-aryl-alkyl propionate in anhydrous alcohol, adding hydrazine hydrate, heating on a boiling water-bath, filtering hot with decolorizing charcoal, letting the filtrate stand and separating the crystalline precipitate of hydrazide of α-alkoxy-methyl-β-hydroxy-β-aryl-alkyl propionate.

5. The process of preparing 5-aryl-4-alkoxy-methyl-2-oxazolidones of the general formula

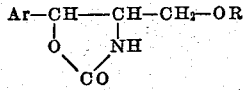

wherein Ar represents an aryl and R represents a lower alkyl, said process comprising reacting an arylaldehyde with an α-halo-β-alkoxy-alkyl propionate in an anhydrous solvent solution and in the presence of zinc at a temperature between 0° and 100° C., cooling, taking up with water, acidifying against Congo paper, separating and dehydrating the solvent layer, evaporating the solvent in vacuum, distilling the residue in high vacuum, dissolving distilled α-alkoxy-methyl-β-hydroxy-β-aryl-alkyl propionate in anhydrous alcohol, adding hydrazine hydrate, heating on a boiling water-bath, filtering hot with decolorizing charcoal, letting the filtrate stand, separating the crystalline precipitate of hydrazide of α-alkoxy-methyl-β-hydroxy-β-aryl-alkyl propionate, suspending in ice water, adding acetic acid, treating with an aqueous sodium nitrate solution in the cold, separating the resulting gummy substance, extracting with benzene, adding a small amount of ether to the oily residue, dissolving the resulting crystalline material in a benzene-ether mixture and recrystallizing and separating 5-aryl-4-alkoxy-methyl-2-oxazolidone.

6. The process of preparing 1-aryl-2-amino-3-alkoxypropane-1-ols according to claim 1, comprising dissolving said 5-aryl-4-alkoxy-methyl-2-oxazolidone in ethanol, adding an (about 3%) aqueous solution of barium hydroxide, refluxing for 2 to 10 hours, cooling, acidifying with hydrochloric acid, evaporating the alcohol and part of the water in vacuum, making alkaline, extracting repeatedly with ethyl acetate, drying, taking up with acidified ether and separating a solid product of the general formula

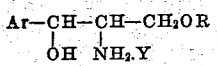

wherein Y represents an acid residue.

7. Compounds of the general formula

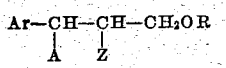

wherein Ar represents phenyl, R represents a lower alkyl,

A represents a hydroxyl, Z represents a member of the group consisting of —COOR and —CO—NH—NH$_2$ and A plus Z represent —O—CO—NH—.

8. Compounds of the general formula

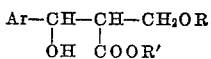

wherein Ar represents phenyl and R, R' represent a lower alkyl.

9. Erythro-α-methoxymethyl - β - phenyl-β-methylhydracrylate.

10. Compounds of the general formula

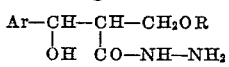

wherein Ar represents phenyl and R represents a lower alkyl.

11. Erythro - α - methoxymethyl - β - phenylhydracrylic acid and hydrazide.

12. Compounds of the general formula

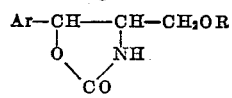

wherein Ar represents phenyl and R represents a lower alkyl.

13. Cis-4-methoxymethyl-5-phenyl-2-oxazolidone.

References Cited in the file of this patent

UNITED STATES PATENTS

| | | |
|---|---|---|
| 2,399,118 | Homeyer | Apr. 23, 1946 |
| 2,513,346 | Moersch et al. | July 4, 1950 |

FOREIGN PATENTS

| | | |
|---|---|---|
| 913,163 | France | May 20, 1946 |
| 858,402 | Germany | Dec. 8, 1952 |